July 2, 1957
R. L. H. KOSCHE
2,797,472
METHOD OF RUNNING IN FRICTION BRAKES
Filed Dec. 10, 1953
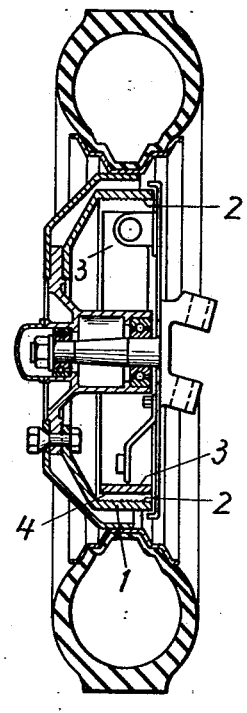
INVENTOR
RUDOLF L.H. KOSCHE
BY *Dicke and Craig*
ATTORNEYS

2,797,472

METHOD OF RUNNING IN FRICTION BRAKES

Rudolf L. H. Kosche, Stuttgart-Unterturkheim, Germany, assignor to Daimler-Benz Aktiengesellschaft, Stuttgart-Unterturkheim, Germany Application December 10, 1953, Serial No. 397,380

Claims priority, application Germany December 15, 1952

3 Claims. (Cl. 29—404)

The present invention relates to a method of running in friction brakes, and more particularly relates to a method of running in or braking in new brake linings in friction brakes.

In order to cause newly-lined brake shoes to be run in or broken in rapidly, it is well known to prepare the brake linings by means of filing, milling or turning down the diameter thereof. Aside from the fact that these measures do not always bring about satisfactory results, they take up relatively much time and require a considerable amount of expenditure.

Accordingly, it is an object of the present invention to shorten the period necessary for running in the brake linings and to thereby reduce the expenditures connected therewith.

The present invention proposes an arrangement whereby the brake part provided with a brake lining is assembled with a counter-piece, such as, for example, the brake drum, which has a contact surface normally engaged by the lining during the braking operation, whereby the contact surface of the counter-piece in accordance with the present invention distinguishes itself essentially from the usual counter-piece by a greater roughness of the surface in contact with the lining. The brake mechanism thus assembled is permitted to operate in a normal manner so as to run in the brake lining while in contact with the surface roughened counter-piece during normal operation of the brake mechanism. The counter-piece with the roughened surface may be removed and replaced by the ordinary counter-piece having a smooth surface. This method of running in the brake lining brings about an unobjectionable brake surface in a very short time, even in case of very uneven brake linings, as the run-in is caused by ta tool or member which, for all practical purposes, corresponds to the ultimate counter-piece ordinarily used in the brake mechanism.

According to another feature of the present invention, the surface roughened counter-piece may either be replaced by a counter-piece of the ordinary type which has a smooth brake surface, or may also be used in the brake mechanism in question for normal operation thereof after the brake lining is run in. During the period in which the brake lining is run in the surface roughness of the counterpiece will be diminished so as to comply with the requirements for normal operating conditions.

According to another feature of the present invention, the brake surfaces of the normal counter-pieces, which, for example, may be brake drums, are roughened by means of a sand blasting prior to the run-in operation.

During the run-in period of the brake linings, not only an increased abrasion of the brake linings is obtained thereby which results in a very good brake surface, but the braking surface of the drum is also smoothed thereby more and more so that the drum, previously sand blasted, may also be continued in its use during normal operation of the vehicle.

Further features, advantages and objects of the present invention will become more obvious from the following description when taken in connection with the single figure of the drawing which shows a cross section through a truck front wheel, the brake mechanism of which has been run in according to the present invention.

In the illustrated embodiment the front wheel is completely assembled in a normal manner and ready for operation. The cylindrical friction surface 2 of the brake drum which is designed to absorb a radial braking pressure, has been roughened by means of sand blasting before assembly thereof. During the initial period of running in the brake linings when driving the vehicle, the brake lining 4 provided on the brake shoes 3 will quickly adapt itself to the shape of the brake drum at the roughened surface 2 thereof, when the brake is applied, by reason of the abrasion which occurs as a result of the surface roughness of the brake drum.

What is claimed is:

1. In a brake mechanism for vehicles having a brake lining mounted on a brake shoe normally cooperating with the brake surface of a counter-piece formed in a complementary manner with respect to said brake shoe, the method of running in a new brake lining mounted on said brake shoe comprising the steps of intentionally roughening said brake surface to a greater roughness than the roughness of the usual counterpiece before assembly of said brake mechanism, assesmbling said brake shoe with said lining and said counter-piece in said brake mechanism in the ordinary manner, and running in said brake lining by operating the thus assembled brake mechanism during normal operating conditions.

2. The method according to claim 1 wherein said step of roughening is accomplished by sand blasting.

3. The method of running in a new brake lining according to claim 1, further comprising the step of substituting a brake drum with a smooth brake surface of similar shape as the brake drum with the roughened braking surface for the latter after completing the run-in period.

References Cited in the file of this patent

UNITED STATES PATENTS

| | | |
|---|---|---|
| 1,610,927 | Butler | Dec. 14, 1926 |
| 1,728,172 | Bendix | Sept. 17, 1929 |
| 1,747,672 | Jeffrey | Feb. 18, 1930 |
| 1,811,999 | Evans | June 30, 1931 |